United States Patent [19]

MacDonald

[11] 3,972,406

[45] Aug. 3, 1976

[54] WINDROW LOADER

[75] Inventor: Raymore D. MacDonald, Eureka, Ill.

[73] Assignee: Rivinius, Inc., Eureka, Ill.

[22] Filed: Jan. 28, 1975

[21] Appl. No.: 544,755

[52] U.S. Cl. ................................. 198/9; 37/43 D
[51] Int. Cl.² ........................................ B65G 65/20
[58] Field of Search ............... 198/9, 36; 56/364; 37/43 D, 43 E, 43 F, 43 G, 5, 189; 214/507

[56] References Cited
UNITED STATES PATENTS

| | | | |
|---|---|---|---|
| 1,245,656 | 11/1917 | Anderson | 198/9 |
| 2,132,790 | 10/1938 | Jeswine | 37/43 F |
| 2,247,049 | 6/1941 | Bosworth | 198/9 |
| 2,337,108 | 12/1943 | Jensen | 37/43 D |
| 2,482,213 | 9/1949 | Ritchie | 37/43 D |
| 2,669,338 | 2/1954 | Kling | 198/9 |
| 3,452,461 | 7/1969 | Hanson | 37/189 |

Primary Examiner—John J. Love
Assistant Examiner—Jeffrey V. Nase
Attorney, Agent, or Firm—Polster and Polster

[57] ABSTRACT

A self-propelled, belt-conveyor type windrow loader is provided with a pair of box members spaced from and parallel to one another, pivotally mounted on the conveyor frame, a fixed torque tube is carried by and extends between the box members at an end thereof near the vehicle, a shaft is rotatably journaled within the fixed torque tube and extends between and into the confines of the box members the axis of rotation of the shaft being displaced from the pivot axis of the box members, upper power train sprockets are mounted on the shaft for rotation therewith, an outer shaft is rotatably journaled in each of the box members, outer power train sprockets are connected to be driven by the upper power train sprockets and mounted within the box members to drive the outer shaft, a rotating cross torque tube is connected to the outer shaft to be driven therewith, the box members totally enclosing the power train elements.

5 Claims, 9 Drawing Figures

WINDROW LOADER

BACKGROUND OF THE INVENTION

In windrow loaders known heretofore, the support for the rotating shaft upon which feeder blades were mounted has taken the form of a heavy open frame. The abrasive nature of the materials with which loaders of this type are used leads to excessive wear of the exposed moving parts.

One of the objects of this invention is to provide a loader feed mechanism the drive train of which is completely enclosed, which feed mechanism is free-floating within limits, and relatively light and strong compared with conventional construction.

Other objects will become apparent to those skilled in the art in the light of the following description and accompanying drawings.

SUMMARY OF THE INVENTION

In accordance with this invention, generally stated, in a windrow loader with a rotary feeder and a conveyor carried by a chassis, a pair of box members is provided spaced from and parallel to one another, pivotally mounted on the conveyor frame and projecting therefrom, a fixed torque tube is carried by and extends between the box members at one end thereof, a shaft is journaled within the fixed torque tube and extends between and into the confines of said box members; upper power train means are mounted on the shaft for rotation therewith; outer shaft means are rotatably journaled in each of the box members; second power train means are operatively connected to be driven by the upper power train means and mounted within the box members on and to drive the outer shaft means, a rotating cross torque tube is connected to the outer shaft means to be driven therewith, the cross torque tube extending between the box members, and feeder arms are mounted on the cross torque tube, the box members totally enclosing the power train members.

DESCRIPTION OF THE PREFERRED EMBODIMENT

Figure 1:
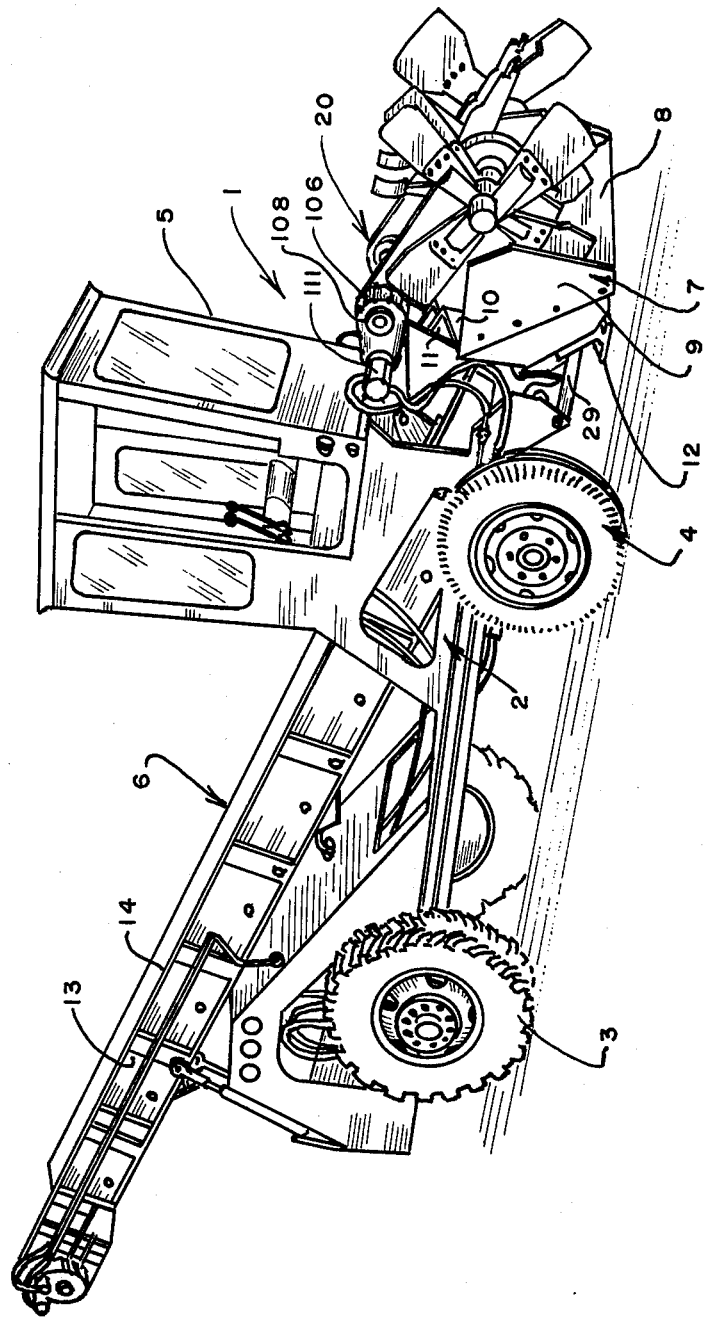
FIG. 1 is a view in perspective of one embodiment of self-propelled windrow loader equipped with a feeder of this invention.
Figure 2:
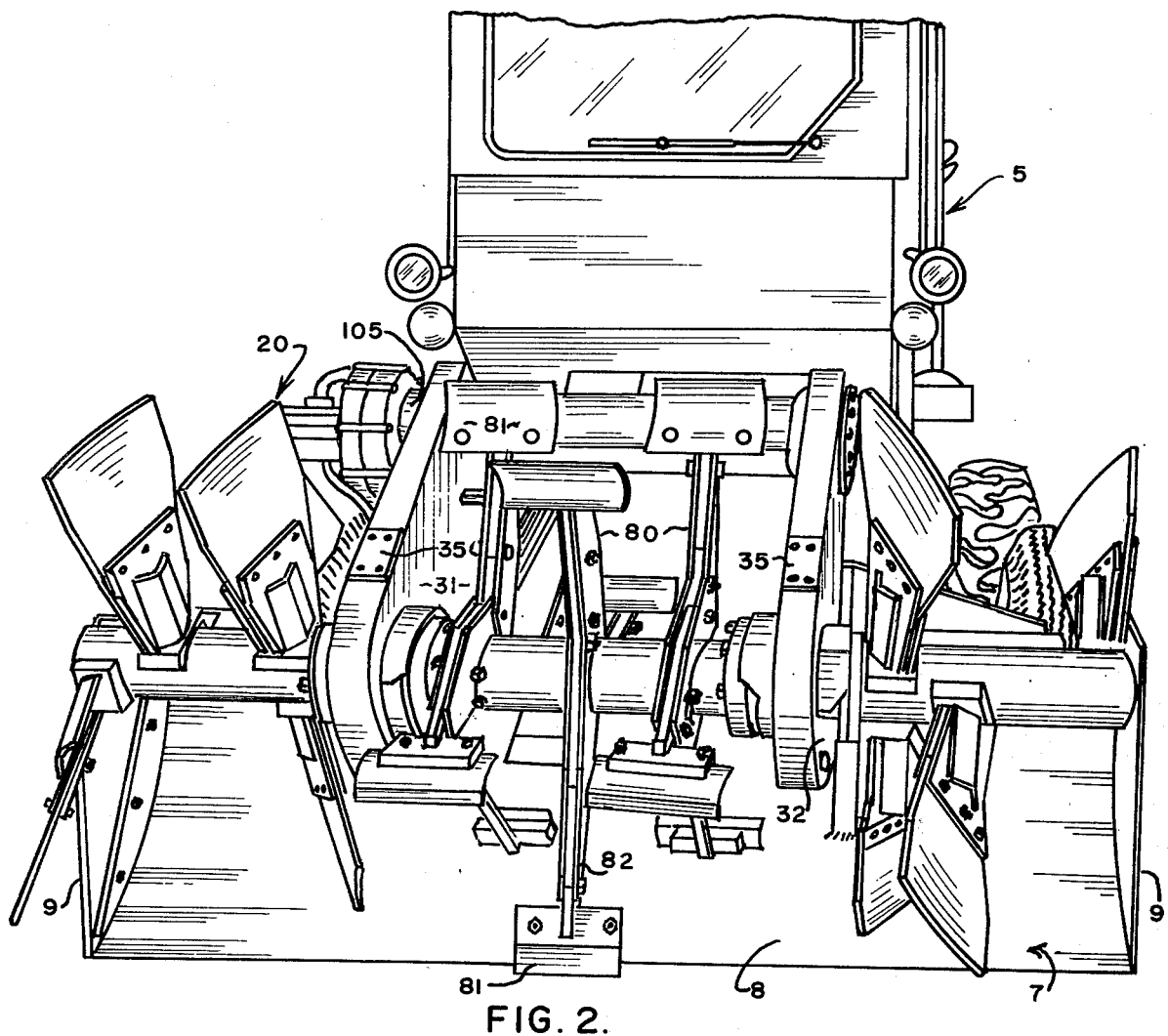
FIG. 2 is a view in perspective of the front end of the loader of FIG. 1 showing the feed mechanism in greater detail.

Referring now to the drawings for one illustrative embodiment of loader of this invention, reference numeral 1 indicates a self-propelled windrow loader with a chassis 2, traction wheels 3, steering wheels 4, and a cab 5. A belt conveyor 6 is mounted on the chassis 2. The belt conveyor 6 has heavy side rails 13 with an upper flange 14 and a lower flange, and a belt 18. The conveyor 6 is supported at its discharge end by and raised and lowered at its discharge end by means of hydraulic cylinders, and the belt is driven by a hydraulic motor in a conventional manner. The belt conveyor extends beneath the cab 5 and forward of the cab to place just below an upper edge of a bucket 7.

The bucket 7 is made up of a blade 8 which curves upward rearwardly and is formed with a rectangular opening in its center defining a belt feed port, and wings 9 which serve as sides. Baffles 10 which may be bent from the material at the center of the bucket extend behind the bucket, and are connected to rearwardly extending side walls 11, which are secured to the upper flange 14. The baffles 10 and side walls 11 define a sort of chute through which material is directed onto the upper surface of the belt. A ground engaging wear and guide shoe 12 on either side of the bucket, forms part of the bucket structure, as shown in FIG. 1. A pad bracket 19 is welded to the upper edge of each baffle 10 and the rear upper edge of the bucket as shown in FIG. 8.

Figure 8:
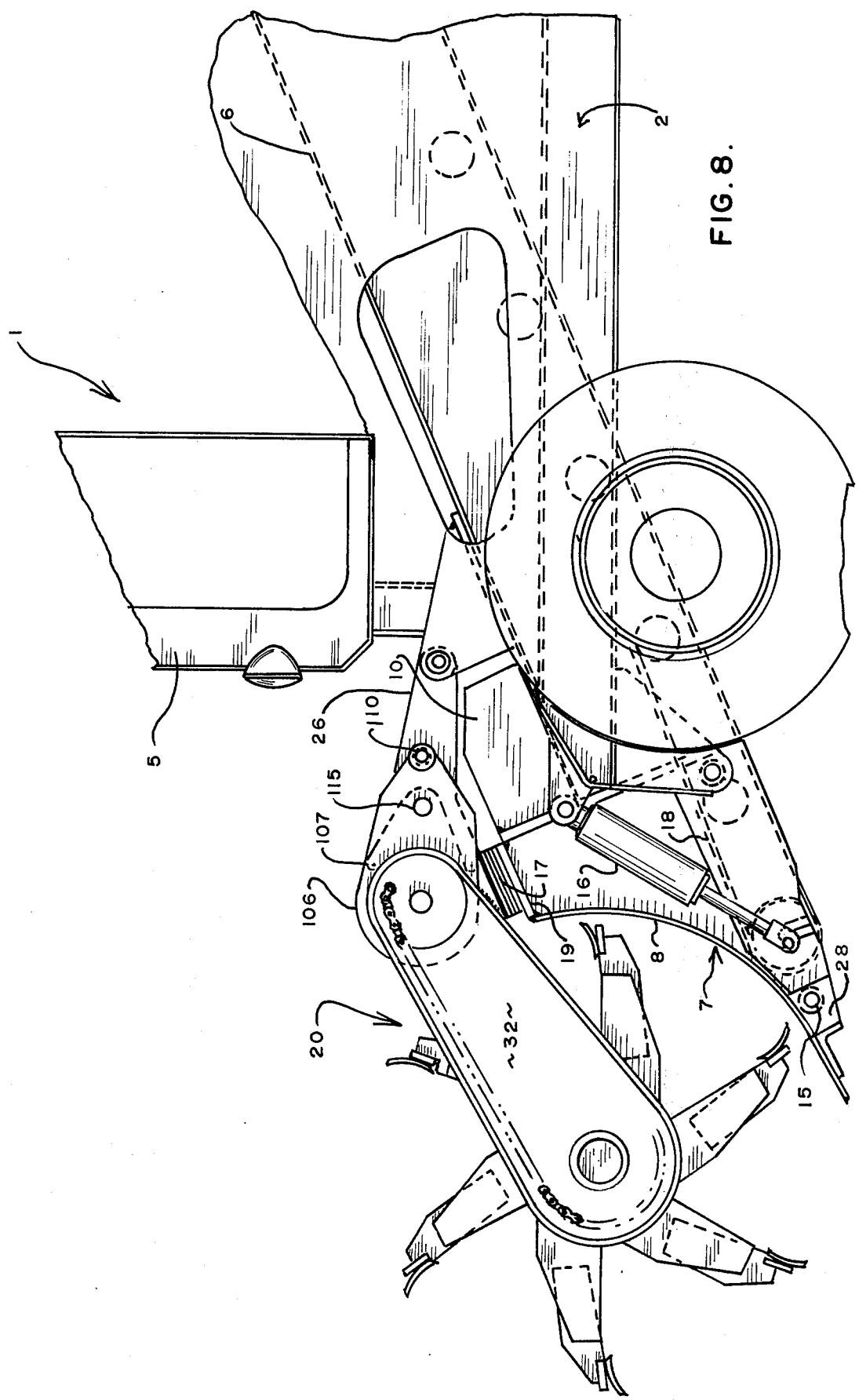
FIG. 8 is a sectional view taken along the line 8—8 of FIG. 4.

As shown particularly in FIG. 8, heavy brackets 28, fastened to the underside of the blade 8, are connected to an extension of each side rail of the belt conveyor and to one end of a lifting link 29 the other end of which is pivotally mounted on the chassis of the vehicle. A hydraulic cylinder 16 has a piston pivotally connected to the extension at one end and is itself pivotally connected to a fixed lug on the chassis 2, so that the lower end of the belt conveyor can be raised and lowered, and with it the bucket 7.

A shimmed bumper pad 17 is bolted to the bracket 19 on the bucket frame, and serves as a support and a stop for a feeder mechanism 20, limiting its downward movement, but leaving the feeder free to float upwardly, as will be explained hereinafter.

Figure 4:
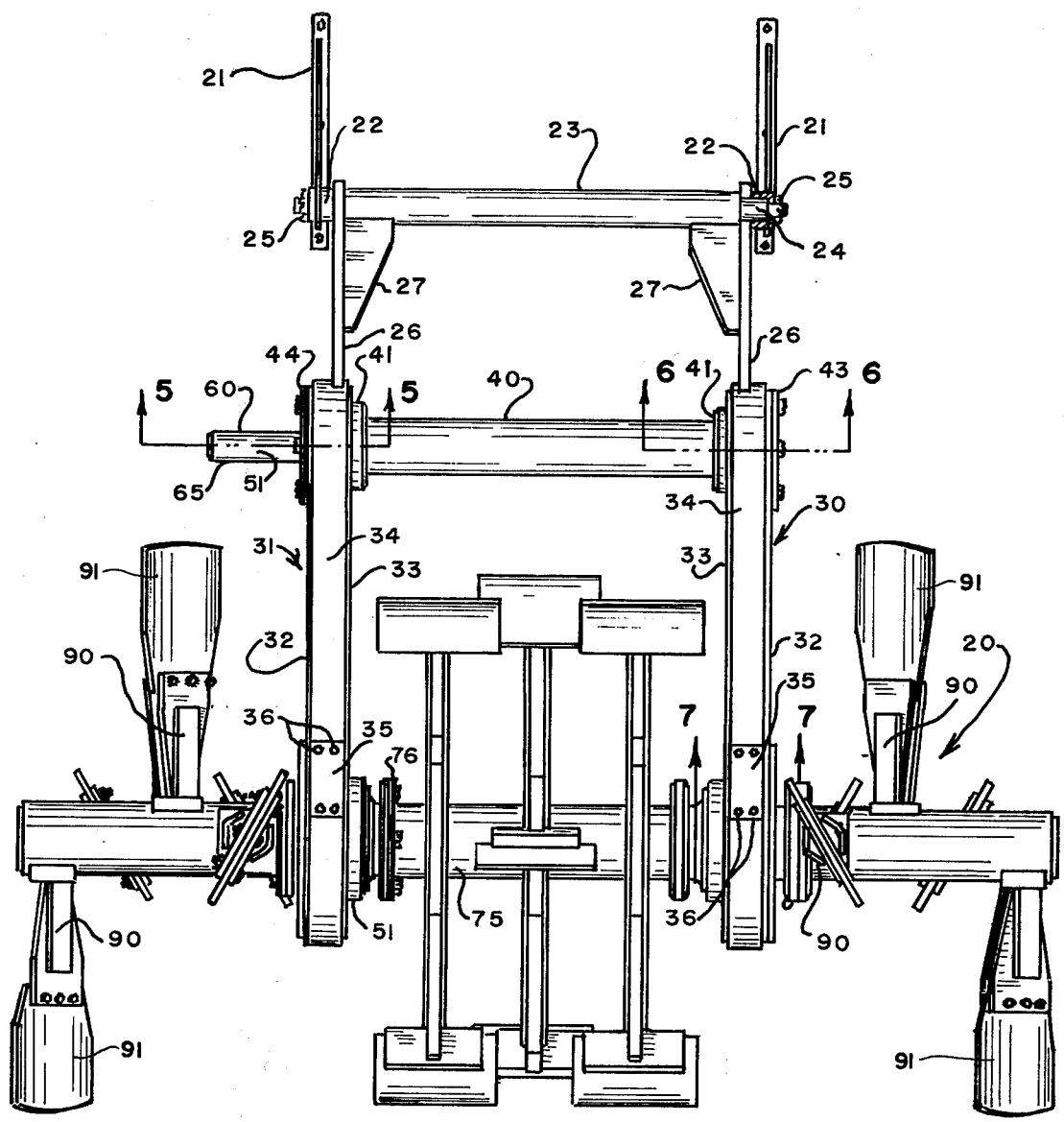
FIG. 4 is a top plan view with certain elements omitted, of the feeder mechanism shown in FIG. 2.

Referring now particularly to FIG. 4, the feeder mechanism 20 includes, in this embodiment, support brackets 21 securely mounted to the upper flanges 14 of the side rails 13 of the conveyor. The support brackets carry bearing sleeves 22 in which stub axles 24 of a support shaft 23 are journaled for rotation. The outer ends of the support shaft are reduced and threaded to accept nuts 25, by which the support shaft is held against axial movement. Support arms 26 are welded or otherwise fixed to the shaft 23, and are reinforced with gussets 27. At their forward ends, the support arms 26 are welded to the rear ends of box members 30 and 31.

Each of the box members 30 and 31 is made up of outboard side plates 32, inboard side plates 33, and a circumferential wall 34 welded securely to the side plates 32 and 33. The plates 32 and 33 and the circumferential wall 34 are made of heavy steel plates, and the box members are rigid.

Near their outer ends, the box members are provided with access holes through the circumferential walls, which are covered by access hole covers 35, securely mounted to the circumferential wall by means of bolts 36.

As seen more particularly in FIG. 8, the top and bottom edges of the side plates 32 and 33 are, in this embodiment, somewhat divergent outwardly.

Figure 5:
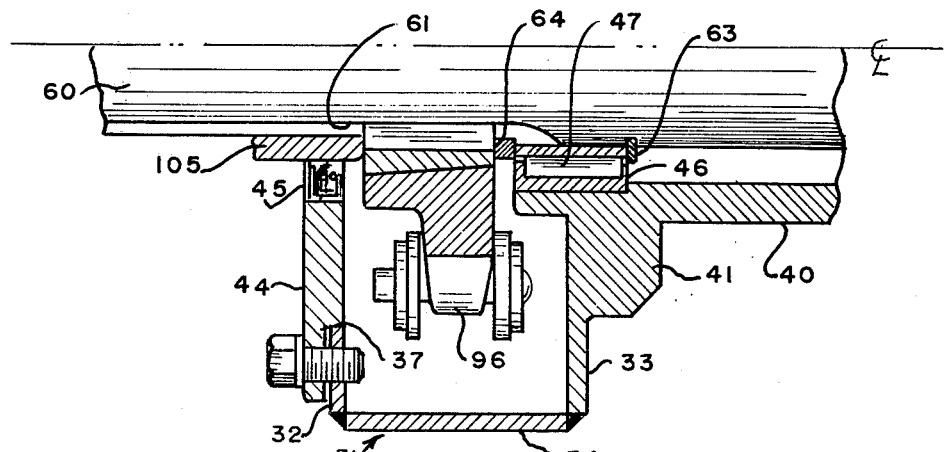
FIG. 5 is a half-sectional view taken along the line 5—5 of FIG. 4.
Figure 6:
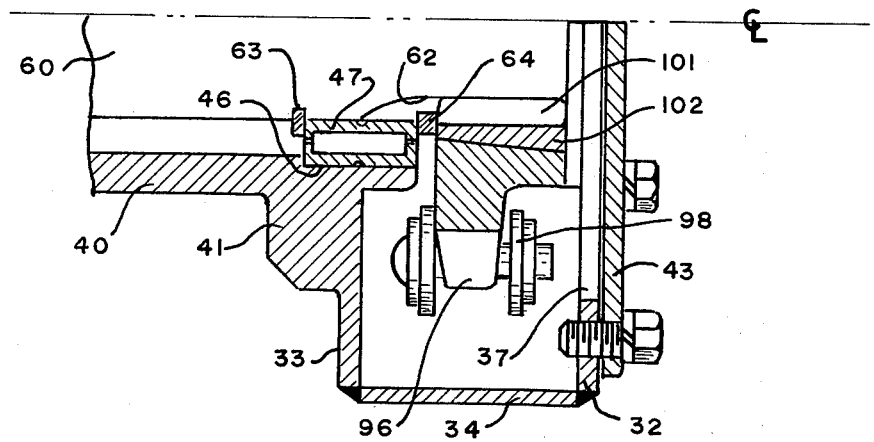
FIG. 6 is a half-sectional view taken along the line 6—6 of FIG. 4.
Figure 7:
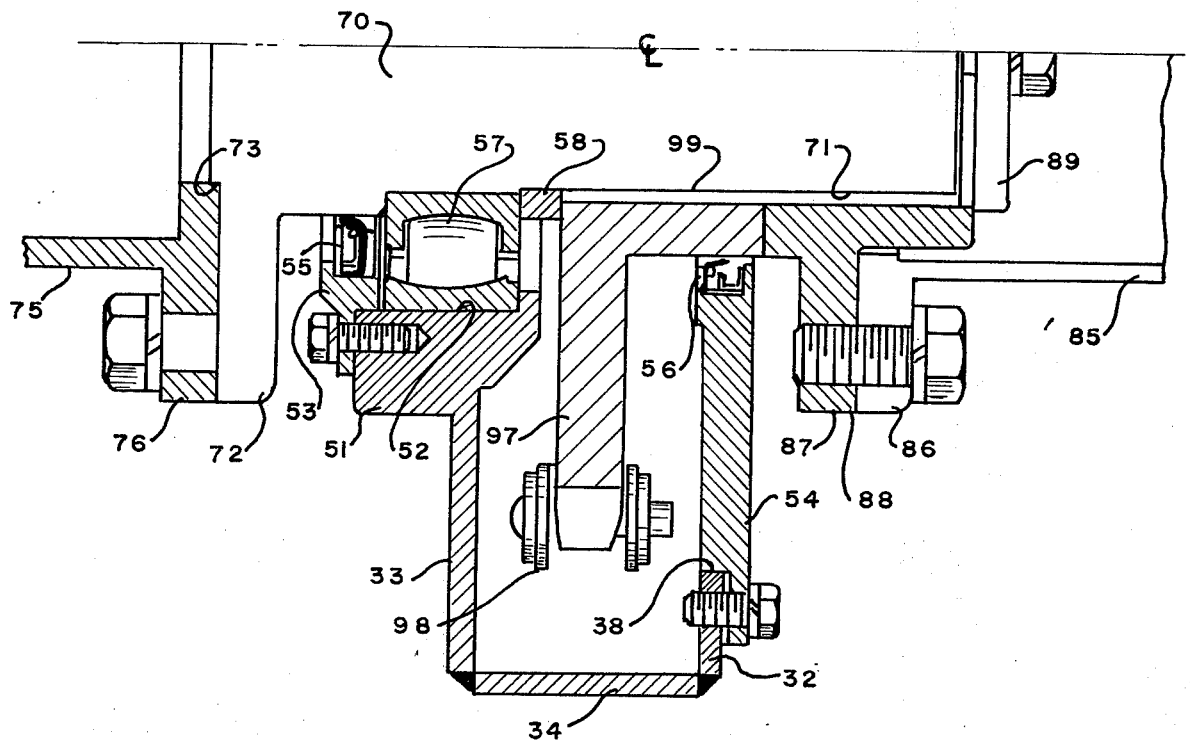
FIG. 7 is a half-sectional view taken along the line 7—7 of FIG. 4.

Referring now particularly to FIGS. 5, 6 and 7, at the end of the box members nearer the cab, the outboard side plates 32 are provided with access ports 37 and at the outer end with outer access ports 38. At the end nearer the cab, a fixed torque tube 40, with an annular boss or flange 41 at each end, either integral with or welded to the inboard side plates 33, extends between the two inboard side plates 33. The fixed torque tube is hollow, cylindrical, and, in this embodiment, concentric with the access ports 37. The access ports 37 are closed by cover plate 43 on the box member 30 and cover plate 44 on the box member 31. The cover plate 43 has a plane side which rests flat against the surrounding side plate surface, and is bolted to the side plate 32, as shown in FIG. 6. The cover plate 44 has an annular rabbet, is somewhat heavier than the plate 43, and has a central opening, circular in plan, in which an annular seal 45 is mounted. The plate 44 is bolted, by means of bolts extending through the radially outwardly extending lip of the rabbet, to the outboard side plate 32.

In both of the ends of the torque tube 40, in the heavy section formed at the annular boss 41, the inside surface of the tube is formed with a bearing seat 46, in which roller bearings 47 are mounted.

At the outer end of both the box members 30 and 31, the inboard side plate 33 are provided with heavy annular bosses 51 formed with bearing seats 52 in which large, heavy-duty roller bearings 57 are seated. A cover ring 53, bolted to an exterior face of each annular boss 51, carries an annular seal 55. A cover plate 54, with a central circular opening in it, carries in the wall defining the opening, an annular seal 56.

Referring now to FIGS. 4, 5 and 6, within the fixed torque tube, extending between and within the compass of the box memnbers 30 and 31, and projecting at one end 65, through and beyond the cover plate 44, as shown in FIGS. 4 and 5, is a drive shaft 60. In the projecting end 65, the drive shaft 60 has a long keyway 61. In the other end, the drive shaft 60 has a relatively short keyway 62. The drive shaft 60 is journaled for rotation in the roller bearings 47. A retaining ring 63 in an annular groove in the drive shaft abuts the inboard edge of the roller bearing 47; an outboard retaining ring 64 abuts the outboard edge of the roller bearing.

At the outer end of the box members 30 and 31, stub shafts 70, oppositely disposed but identical, are journaled for rotation in the roller bearings 57. Each of the stub shafts 70 has a keyway 71 extending from its outboard end, and a flange 72 at its inboard end. The flange 72 projects radially and has on its axially inboard surface an annular rabbet 73. A cross torque tube 75 with a flange 76 at each end is bolted to and between the flanges 72. The flange 76 extends both radially outwardly and inwardly from the wall of the cross torque tube, as shown in FIG. 7, and seats closely within the rabbet 73, which serves as a centering device, to ensure concentricity with respect to the axis of rotation of the shafts 70.

Spade arm brackets 80 are welded or otherwise secured to the cross torque tube 75, and spade handles 82, carrying at their outer ends spade blades 81, are bolted to the spade arm brackets.

Torque tube lateral extensions 85 project outboardly concentrically with each end of the cross torque tube. As shown particularly in FIGS. 4 and 7, each of the extensions 85 is provided with a radially outwardly extending flange 86, which is bolted to a flange 88 of a flanged collar 87 keyed to the outboard end of the stub shaft 70, and held against axial movement by an end plate 89 bolted to a radical face of the outboard end of the shaft 70. The extension 85 has welded to it auger paddle brackets 90, to which auger paddles 91 are bolted.

The rotating cross torque tube 75 and the extensions 85 are driven through the agency of a power train 95 which includes upper chain sprockets 96 keyed to the shaft 60, and outer chain sprockets 97 each keyed to a stub shaft 70, as shown in FIGS. 5 through 7. A chain 98 is mounted on each set of sprockets 96 and 97.

In particular, the upper chain sprockets 96 are mounted axially against the outboard retaining ring 64, and held in place by a key 101 mounted in the keyway 62, and a wedge sleeve 102, in a conventional manner.

The sprocket 97, which has a cylindrical hub 99, abuts axially the retaining ring 58, is keyed to the shaft 70, and is held against outward axial movement by the abutment of a cylindrical portion of the flanged collar 87, which, as has been indicated, is in turn secured by the end plate 89.

As can be seen from FIGS. 6, 7, and 8, the sprocket 96 is smaller than the sprocket 97, so as to provide some speed reduction.

Figure 3:
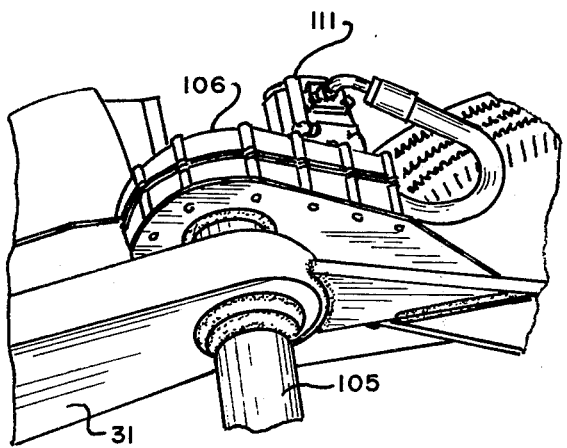
FIG. 3 is a fragmentary view in perspective showing a portion of the drive mechanism of the feeder.
Figure 9:
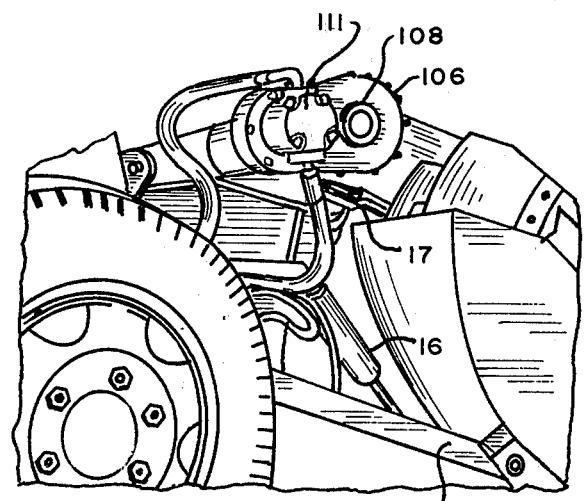
FIG. 9 is a fragmentary view in perspective illustrating the rear of the bucket and lift and drive mechanism of the feeder.

The sprockets 96 are driven through the shaft 60 by a sprocket keyed to the projecting end 65 of the shaft 60 within a gearbox 106 mounted on a torque plate which in turn is mounted on a stud and gusset welded to the outboard side of one support arm 26, as shown in FIGS. 3 and 9. The end 65 in the embodiment shown, projects all the way through the gearbox 106 and is held axially by a locking collar 108, as shown in FIG. 1. The gearbox 106 has on one side of it a cylindrical housing part 105, which, as shown in FIG. 5, projects through the seal 45 of the cover plate 44 when the gearbox 106 is mounted on the arm 26. The gearbox also carries a hydraulic motor 111 with a drive shaft 110, which projects into the gearbox and carries a spur gear which drives a larger gear mounted on a sprocket shaft, which drives a sprocket mounted on a shaft 115 which carries a chain 107 which is also carried by the drive sprocket mounted on the end 65 of the shaft 60. The gear and sprocket arrangement is all conventional in the speed reducer and gear art, and is indicated only sketchily.

In assembling the feeder of this invention, the bucket and its incidents are fabricated, assembled and mounted on the chassis. The box members 30 and 31, torque tube 40, plates 26, and support shaft 23, are fabricated. The cover plates 43, 44 and 54 and cover ring 53 are removed. The shaft 60, with retaining rings 63 in place, is inserted into the torque tube 40. The roller bearings 47 are seated, the outboard retaining rings 64 are put into their grooves in the shaft, and the sprockets 96 are mounted.

At the outer end of the box members, the roller bearings 57 are seated, the stub shafts 70, with the cover rings 53 on them, are mounted, and the retaining rings 58 are put into place.

The sprockets 97 are mounted on the ends of the shafts 70. The chain 98 is mounted on the sprockets 96 and 97. The cover plates 43 and 54 are mounted. The flanged collars 87 are mounted against the sprockets and the end plates 89 bolted in place.

The feeder assembly can be mounted on the support brackets 21 at any time in the proceedings.

The torque tube 75 is bolted between the flanges 72 of the stub shaft 70. The lateral extensions 85 are bolted to the flanges 88. The cylindrical housing 105 of the gearbox is inserted into the seal 45, and the shaft 60 keyed to the sprocket inside the gearbox which is to drive the shaft, the gearbox is bolted to the torque plate and the locking collar 108 is mounted. If it has not already been done, the hydraulic motor is mounted on the gearbox, and suitable hydraulic connections made.

In the embodiment of loader shown, an internal combustion engine is mounted above the axle of the traction wheels 3, and supplies motive power for the vehicle wheels and also drives a hydraulic pump which supplies hydraulic fluid under pressure to the various cylinders and motors which require it, by way of control valves in the cab 5.

The spacing of the spade blades and auger paddles from the bucket is determined by the height of the shimmed pads 17, which bear upon a lower surface of the support arms 26.

The box members 30 and 31 are liquid-tight, and can be filled to an appropriate level with lubricant.

In operation, the entire assembly, including the lower end of the conveyor, the bucket attached to it and the feed assembly are lowered until the shoes 12 engage the surface on which the loader is resting. The spade blades and auger paddles, spaced at the predetermined desired distance from the blade 8, by virtue of the pads 17, are set to rotating by the operator. As the loader moves forward, the auger paddles convey material to the spade blades which move it onto the belt. If either the auger paddles or the spade blades encounter material which will not be moved, the entire feeder assembly will move upwardly, pivoting at the support brackets about the axis of the stub axles 24.

The box members 30 and 31 are strong, rigid, and relatively light with respect to their strength, and serve completely to enclose the drive train elements within them, not only shielding them from abrasion but permitting continuous effective lubrication. The rest of the drive train which includes the shaft 60, and the sprockets and gears in the gearbox 106 are also totally enclosed, protecting all of those elements from the effect of the abrasive material with which a loader of this type is concerned.

Numerous variations in the construction of the loader of this invention within the scope of the appended claims, will occur to those skilled in the art in the light of the foregoing disclosure. Merely by way of illustration, the conveyor can be of a different type from a belt conveyor, the supporting vehicle can be of a different variety, and the conveyor and feeder assembly can be side-mounted instead of center-mounted. The size and shape of the box members can be varied and their pivoting arrangement can be changed. Different kinds of feed blades and paddles can be used. These variations are merely illustrative.

I claim:

1. In a windrow loader wherein a rotary feeder is carried by a frame and projects forwardly thereof, the improvement comprising a pair of elongated box members spaced from and parallel to one another, pivotally mounted on said frame on a pivot axis perpendicular to the long direction of said box members, said box members projecting forwardly from said frame, a fixed torque tube carried by and extending between said box members at an end thereof near said frame but displaced from said pivot axis, a shaft revolvably journaled within said fixed torque tube and extending between and into the confines of said box members, the axis of rotation of said shaft being wholly displaced from the pivot axis of said box members; first power train means mounted on said shaft for rotation therewith; outer shaft means rotatably journaled in each of said box members; second power train means operatively connected to be driven by said first power train means and mounted within said box members on and to drive said outer shaft means; a rotating cross torque tube connected to said outer shaft means to be driven therewith, said cross torque tube extending between said box members, and feed means mounted on said cross torque tube, said box members enclosing said first and second power train means.

2. In a self-propelled belt type windrow loader wherein a rotary spade type feeder with a plurality of spade arms is carried by a frame of a conveyor mounted on a vehicle the improvement comprising a pair of box members spaced from and parallel to one another, pivotally mounted on said conveyor frame and projecting forwardly therefrom, a fixed torque tube carried by and extending between said box members at an end thereof near said vehicle, a shaft journaled within said fixed torque tube and extending between and into the confines of said box members; a first power train means mounted on said shaft for rotation therewith; outer shaft means rotatably journaled in each of said box members; second power train means operatively connected to be driven by said first power train means and mounted within said box members on and to drive said outer shaft means; a rotating cross torque tube connected to said outer shaft means to be driven therewith, said cross torque tube extending between said box members, spade feeder arms mounted on said cross torque tube and two oppositely laterally outwardly extending torque tube extensions, each mounted at one end on said outer shaft means concentrically with said rotating cross torque tube and laterally outboard thereof, and auger blades mounted on said torque tube extensions, said box members enclosing said first and second train members.

3. In a windrow loader wherein a rotary feeder is carried by a frame and projects forwardly thereof, the improvement comprising a pair of box members spaced from and parallel to one another, pivotally mounted on said frame and projecting therefrom, a fixed torque tube carried by and extending between said box members at an end thereof near said frame, a shaft journaled within said fixed torque tube and extending between and into the confines of said box members; a speed reducing mechanism housed within a gearbox and connected to the shaft journaled in said fixed torque tube, said gearbox being mounted to move with said box members, and a motor mounted on said gearbox and operatively connected to said speed reducing mechanism; first power train means mounted on said shaft for rotation therewith; outer shaft means rotatably journaled in each of said box members; second power train means operatively connected to be driven by said first power train means and mounted within said box members on and to drive said outer shaft means; a rotating cross torque tube connected to said outer shaft means to be driven therewith, said cross torque tube extending between said box members, and feed means mounted on said cross torque tube, said box members enclosing said first and second power train means.

4. The improvement of claim 3 wherein the said box members are fluid tight and contain lubricant through which said second power train means run.

5. The improvement of claim 4 wherein the first and second power train means comprise sprockets, and a chain extends between said sprockets.

* * * * *